United States Patent Office 2,724,563
Patented Nov. 22, 1955

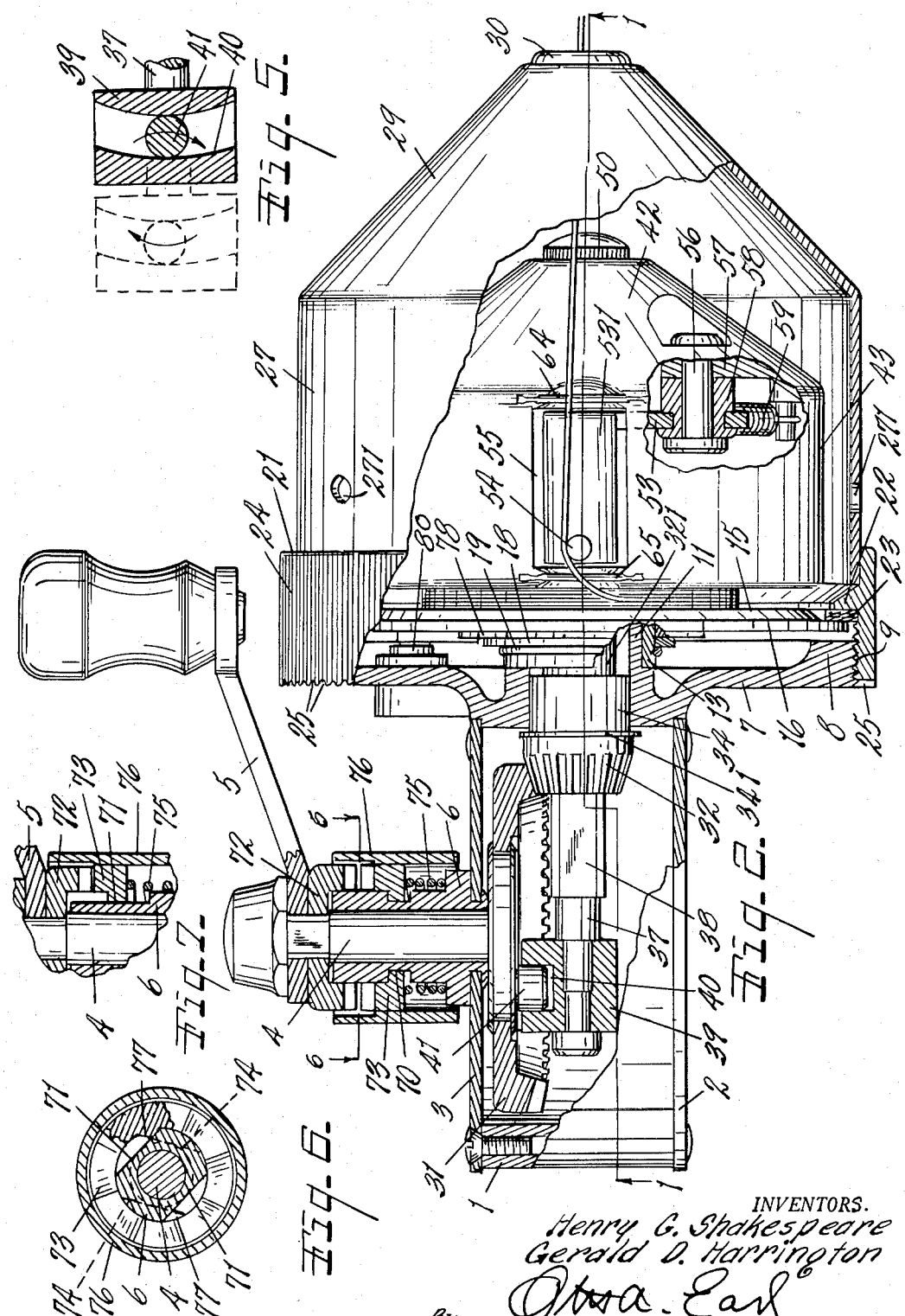

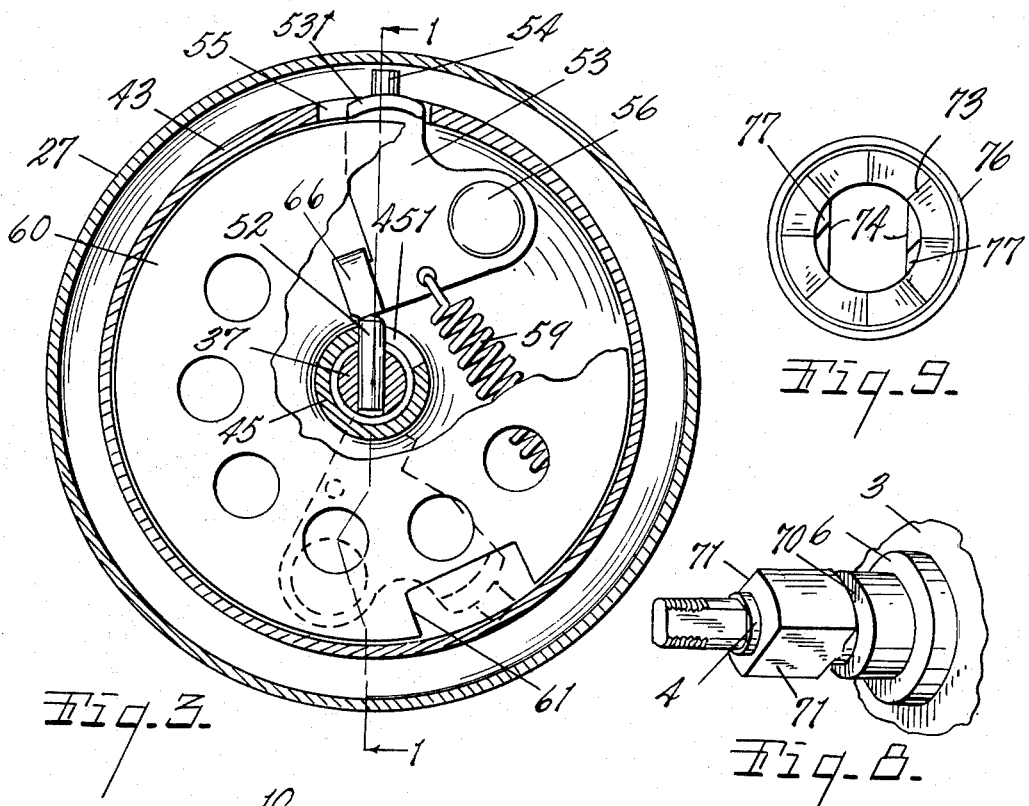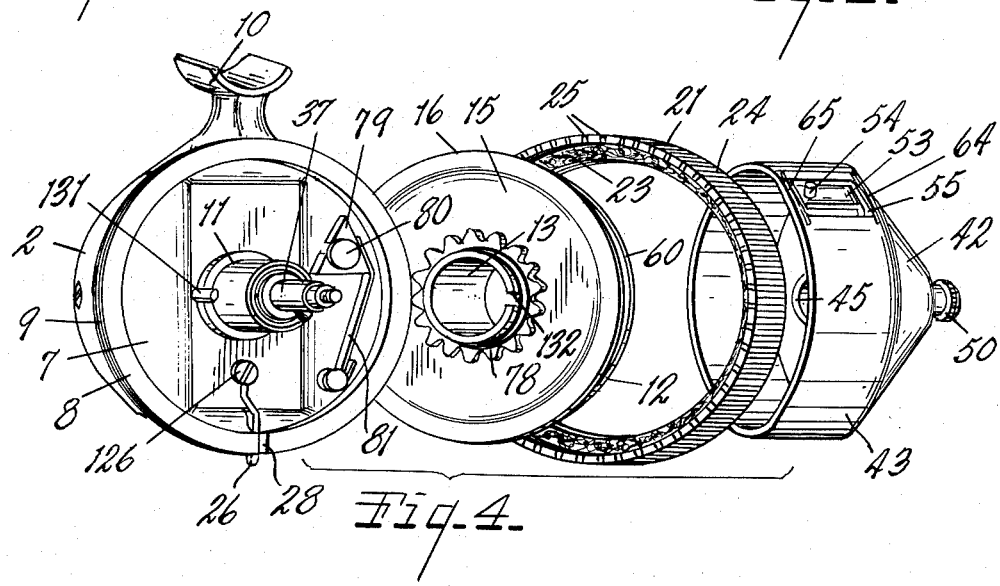

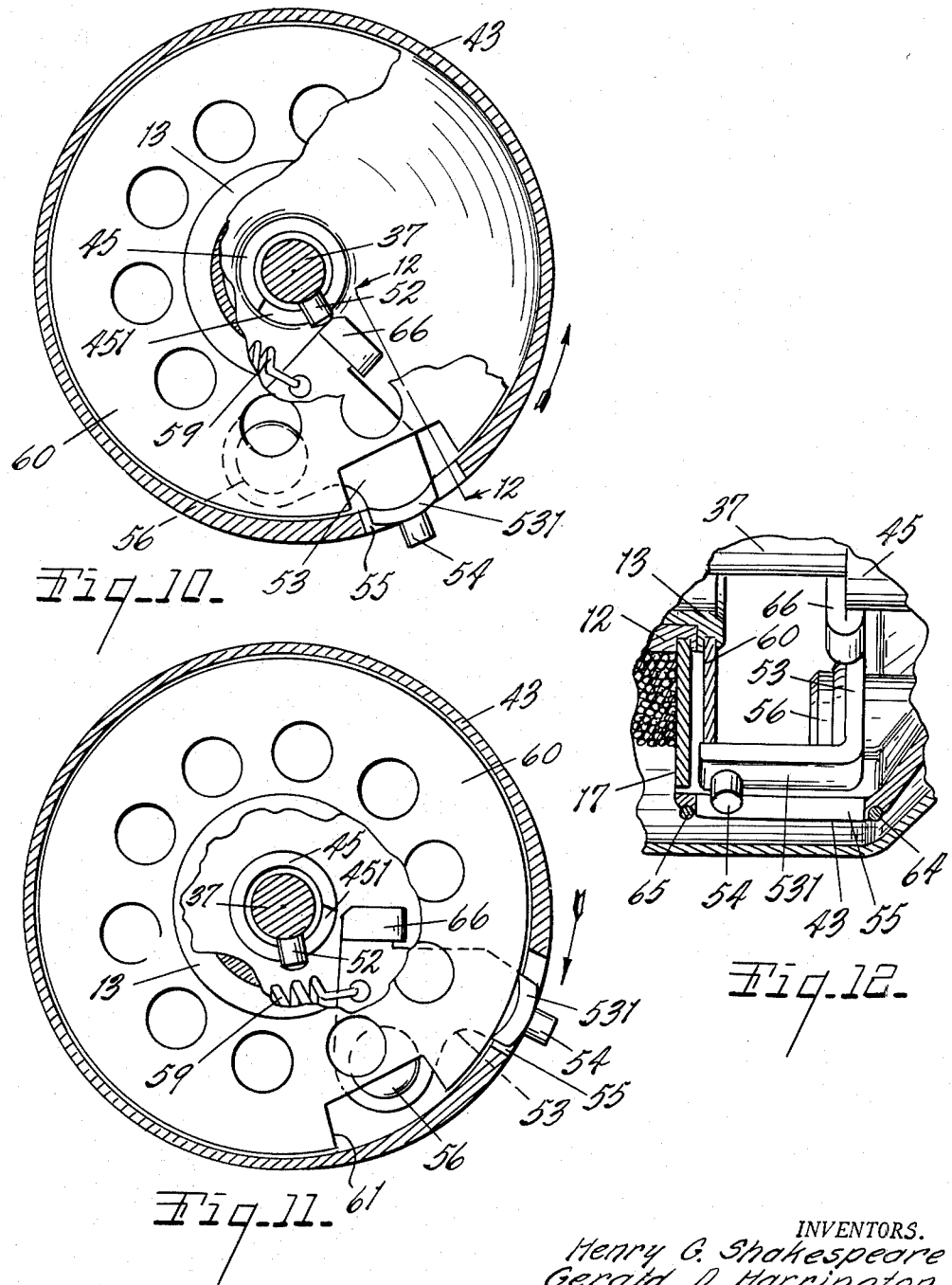

2,724,563

SPINNING TYPE FISHING REEL

Henry G. Shakespeare and Gerald D. Harrington, Kalamazoo, Mich., assignors to Shakespeare Company, Kalamazoo, Mich., a corporation of Michigan Application February 13, 1952, Serial No. 271,324

31 Claims. (Cl. 242—84.4)

This invention relates to improvements in spinning type fishing reels.

The main objects of this invention are:

First, to provide a spinning type fishing reel having a level winding means which is controlled from the crank to wind the line upon the spool when the crank is rotated in one direction and projected to nonrotating casting position when the crank is reversely actuated, the line being freed but effectively guided as it is uncoiled from the spool.

Second, to provide in a reel of this type a level wind means having a pickup member which is retracted when in a position to permit the line to drop therefrom or to be effectively released thereby.

Third, to provide a fishing reel of the spinning type including a level wind member which is rotated and reciprocated relative to the spool and in a manner to provide an even laying or distribution line upon the spool.

Fourth, to provide a manually adjustable spool drag means which is capable of a wide range of adjustment, and is positioned for convenient manipulation.

Fifth, to provide a fishing reel having these advantages, which is quite compact in structure and one in which the parts may be conveniently assembled and disassembled.

Further objects relating to details and economies of the invention will appear from the description to follow. The invention is defined and pointed out in the claims.

Preferred embodiments of the invention are illustrated in the accompanying drawing, in which:

Fig. 2 is a fragmentary plan view, parts being broken away and other parts being shown in horizontal section.

Fig. 3 is a transverse section on a line corresponding to line 3—3 of Fig. 1.

Fig. 4 is an exploded or disassembled view of the gearbox with certain parts assembled thereon, and the spool, drag member and level wind member.

Fig. 5 is a fragmentary view partially in section showing details of the Scotch yoke for imparting reciprocatory movement to the spindle, the parts being shown in one position by full lines and in another position by dotted lines.

Fig. 6 is a sectional view on a line corresponding to line 6—6 of Fig. 2 showing details of the non-reversing clutch mechanism for the crank.

Fig. 7 is a fragmentary longitudinal section of the clutch of Fig. 6.

Fig. 8 is a fragmentary perspective view of the bearing member for the crank shaft illustrating certain of the details for said clutch means.

Fig. 9 is a transverse section showing further details of the clutch means.

Fig. 10 is a fragmentary view partially in cross section illustrating details of the level wind means and the control means for the pickup finger thereof.

Fig. 11 is a fragmentary view partially in cross section illustrating further details of the pickup finger of the level wind with the finger in projected position and illustrating the lost motion connection of certain of the parts.

Fig. 12 is an enlarged fragmentary view mainly in section on line 12—12 of Fig. 10.

Figure 1:
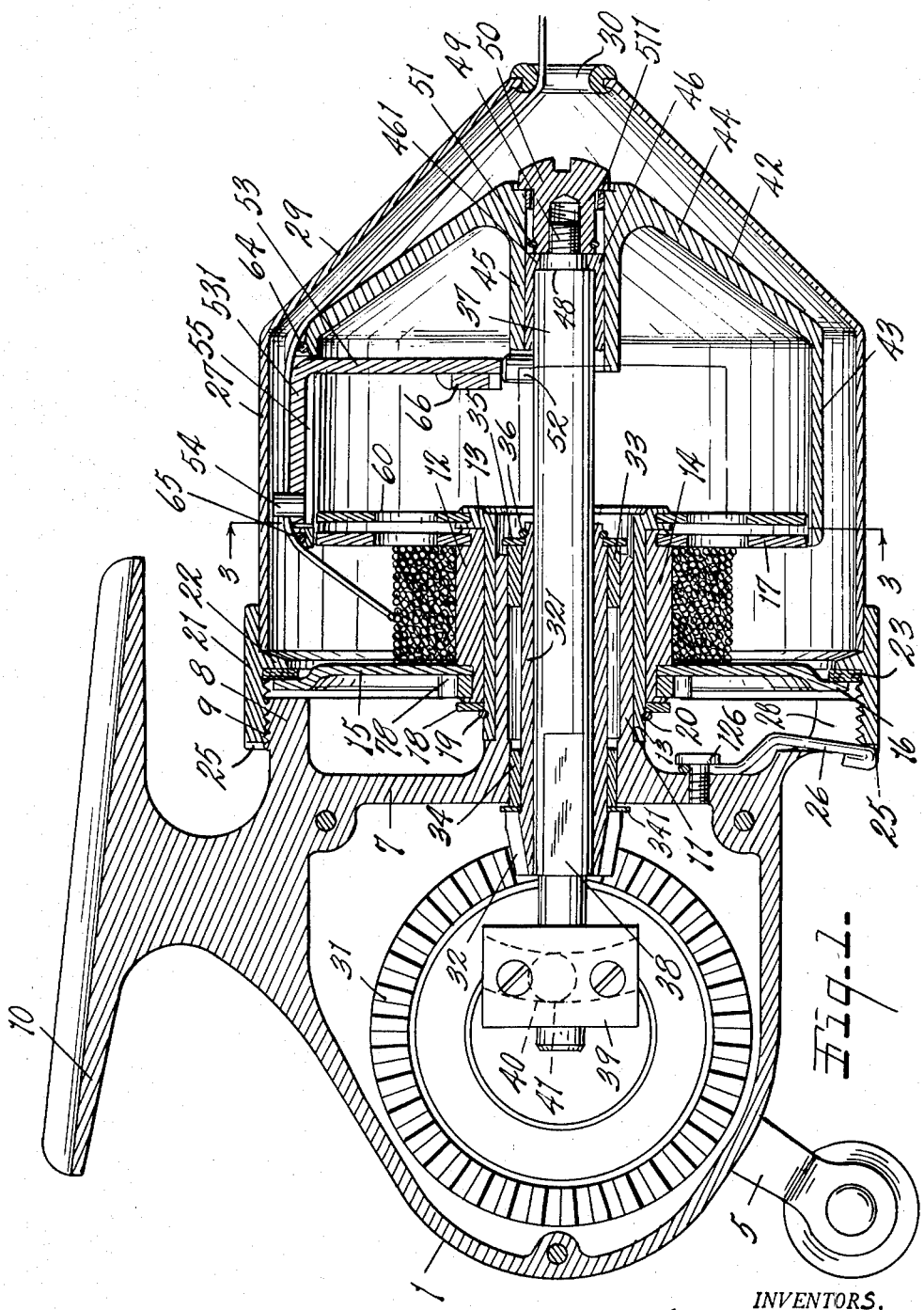
Fig. 1 is a longitudinal section of a reel embodying our invention on a line corresponding to broken line 1—1 of Figs. 2 and 3, certain parts being shown in full lines.

In the accompanying drawings the figures are all substantially enlarged as compared to the commercial reel. This has been done for convenience in illustration and clearness.

The embodiment of the invention illustrated comprises a gearbox or casing 1 having removable side plates 2 and 3. The shaft 4 of the crank 5 is mounted in a bearing 6 secured to the side plate 3. The front wall 7 of the gearbox has a forwardly projecting flange-like head portion 8 peripherally threaded at 9. In the embodiment illustrated the gearbox has an integral reel seat base member 10. The reel illustrated is designed to be mounted on the under side of a fishing rod as is quite general practice with spinning reels. The gearbox has a forwardly projecting tubular bearing 11 on which the spool, designated generally to the numeral 12, is rotatably mounted.

A nonrotatable bushing-like member 13 is disposed on the bearing 11 and constitutes the bearing for the barrel 14 of the spool. The member 13 is prevented from revolving by the lug 131 engaging the slot 132, see Fig. 4. The rear spool flange 15 in the embodiment illustrated has a rearwardly offset peripheral portion 16 which constitutes a friction element or member. The front flange 17 is of less diameter than the rear flange for purposes which will appear later. The member 13 has a flange at its forward end and the spool is further retained by collar 18 sleeved on the member 13. A snap ring 19 coacts with the groove 20 in the member 13 to support the collar 18.

The rotation of the spool is frictionally restrained by the drag member 21 which is threaded upon the annular forwardly projecting portion 8 of the gearbox, and is provided with an internally projecting annular friction member 22 coacting with the peripheral friction portion 16 of the rear spool flange. An annular friction element 23 is arranged between the spool flange 16 and the friction member 22. This provides a relatively large friction area and permits of very accurate adjustment of the drag. The periphery of the drag member 21 is desirably knurled at 24 for convenient grasping. The rear edge of the drag member 21 is toothed or serrated at 25 to be engaged by the detent 26 which is mounted at 126 on the front wall of the gearbox, and projects through an opening 28 therein to coact with the teeth or serrations 25. This holds the drag member in its adjusted position.

The housing member 27 is adapted to frictionally telescope within the drag member. The conical end 29 of the housing is provided with a line guide eye 30 at its apex.

The crank shaft is provided with a beveled driving gear 31 which coacts with the driven gear 32. The driven gear 32 has a sleeve-like hub 321 mounted within the front wall of the gearbox and bearing member 11 thereon. Bearing bushings 33 and 34 are provided for the front and rear ends of the hub 321. A thrust collar 341 is interposed between the gear 32 and the rear bushing 34 as shown in Figs. 1 and 2. A retaining collar 35 is mounted on the front end of the gear hub, the hub being removably retained by the split ring 36.

The spindle 37 is mounted within the gear hub for reciprocating movement, and is rotatable therewith, being provided with a flattened or noncircular portion 38 coacting with a corresponding portion on the gear. The spindle is provided with a Scotch yoke 39 having a slot 40 therein with which the crank pin 41 on the driving gear 31 coacts. The slot 40 of the Scotch yoke is curved for the purpose of providing variable speed in the reciprocation of the spindle, the speed being increased at the forward portion of the stroke. This prevents piling of the line at the front end of the spool and also results in a better or more efficient control of the pickup finger of the level wind member.

The line wind member, designated generally by the numeral 42, is mounted on the front end of the spindle and has a cylindrical rear portion 43 and a conical front portion 44 which is provided with an inwardly projecting hub 45 provided with a bushing 46 bearing on the front end of the spindle. The bushing has an inturned portion 461 coacting with a shoulder 48 at the front end of the spindle. The spindle is threaded at 49 to receive the retaining nut 50. The nut 50 is provided with a stop or retaining ring 51 and clip bushing 511 pressed into the conical portion 44 of the level wind member 42 to retain the nut in assembled relation to the level wind member when the level wind member is removed from the spindle.

The rear end of the hub 45 is slotted at 451 to coact with the level wind driving pin 52 carried by the spindle. This provides the lost motion driving connection.

The cylindrical portion 43 of the level wind member is of such diameter as to reciprocatingly embrace the front flange 17 of the spool, as is illustrated in Figs. 1 and 2, the level wind member being in its projected or forward position in Fig. 1 and in its retracted or rear position in Fig. 2.

The pickup finger 53 of the level wind member is provided with a pin or stud like line engaging member 54. The line wind member is slotted at 55 to receive the finger 53 when in its projected position as is shown in Figs. 1 and 3. The pickup finger is pivoted at 56 on a boss 57 within the line wind member. The pickup finger is provided with a pivot engaging hub portion 58. The pickup finger is biased to its retracted position by the coil spring 59. The pickup finger is actuated to pick up position by means of the pin 52 which acts as a cam.

The cam plate 60 is mounted on the front end of the bushing member 13 in front of the spool. This cam plate is in the form of a disc and is of the same diameter as the spool and has a recess or dwell 61 on its lower edge which allows the pickup finger biased by the spring 59 to retract when it registers with the recess. As the pickup finger is then in down position the line falls away naturally from the finger rather than being drawn into the slot of the level wind member which might result if the cam recess was on the upper side. The pickup finger cannot be retracted except when the line wind member is in its projected position in which position the pickup finger arm 531 does not project over the front flange of the spool but is supported by the cam plate 60. The pin 54 of the pickup finger is of wear resisting material, and the line wind member has hardened elements 64 and 65, preferably in the form of wear resisting wire.

The pickup finger is provided with a lug portion 66 which projects axially over the slot 451 in the hub 45. In assembly the level wind member and its hub 45 on the spindle 37 the pickup finger is projected against the tension of the spring 59 so that the radially inner edge of the lug 66 passes over and engages the end of the drive pin 52 as in Fig. 3. The engagement between the lug 66 and the pin 52 then holds the pickup finger in projected position preventing the inner end of member 53 from blocking slot 451 and permitting the pin 52 to enter into the slot 451 as the assembly of the level wind member axially onto the spindle is completed. After assembly the pin 52 operating in the slot 451 provides a lost motion drive connection between the spindle and the level wind member. The pin 52 being then aligned with the pickup finger 53 forms a cam drive which engages and projects the pickup finger upon forward rotation of the spindle. On reverse rotation of the spindle and pin 52, the pin moves away from the pickup finger and permits the pickup finger to retract into the level wind member with the lug 66 moving into the slot 451 behind the retracting pin 52.

We have mentioned that the slot in the Scotch yoke is curved and that one advantage of this is the more effective laying of the line at the front end of the spool. Another and important advantage is that the increase of speed at the forward end of the stroke results in a shorter dwell of the pickup mechanism when the pickup finger is off the front spool flange and in position to retract, that is, it results in less than one revolution of the pickup when in extreme position and therefore retractions can happen at only one position of the crank and within less than one revolution of the crank. This feature is of substantial importance in the particular embodiment of our invention illustrated.

The crank shaft is provided with a clutch which when adjusted to one position permits continued rotation of the shaft in line winding direction and prevents rotation in the opposite direction.

This clutch mechanism as illustrated comprises the shaft bearing 6 which has a peripheral groove 70 and has a noncircular portion 71 extending outwardly from the groove. In the embodiment illustrated this noncircular portion is of double D section as is best shown in Fig. 8.

An inwardly facing ratchet clutch member 72 is fixed to the shaft to rotate therewith. A coacting ratchet clutch member 73 is mounted on the bearing member 6 for axial sliding movement. The clutch member 73 has internal portions 74 which may be registered with the flattened portion 71 of the bearing member and when so registered the clutch member 73 is free to slide inwardly and outwardly in coacting relation to the clutch member 72.

A spring 75 is arranged on the bearing member 6 to yieldingly urge or bias the clutch member 73 outwardly. The clutch member 73 has a cylindrical finger piece portion 76 which also serves to house the spring and the tooth portion of the clutch member 72. When the clutch member 73 is fully retracted with the parts 74 thereof in registering relation to the groove 70 it may be manually rotated to lock it in retracted position. Stops 77 limit the rotative movement of the member 73.

When the clutch is in engaged position the shaft may be rotated in line winding direction but its rotation in the opposite or reverse direction is prevented. In use this is of substantial advantage in the playing of a fish and operatively coacts with the drag member 21 in playing a fish.

In use the drag member 21 is adjusted to produce the desired friction drag on the spool. This friction drag, it will be understood, is varied according to the requirement as determined by the fisherman. The strength of the line should be taken into consideration.

In playing or reeling in a fish line winding rotation of the crank is permitted while the clutch is in operative position but reverse rotation is prevented by the ratchet clutch. When the pull on the line exceeds the drag friction on the spool the spool will rotate on its bearing to pay out the line and the crank may be operated to take up slack in the line and for reeling in the fish.

In the embodiment illustrated the spool is provided with a click pinion 78 with which the click pawl 79 coacts, the click pawl being yieldably supported on its pivot 80 by the spring 81 mounted on the gear box or support member.

It will be understood that the reel is operative without the housing member 27, but the housing member is very desirable as it aids in guiding the line and minimizes the whipping of the line. It also serves to guide the line in rewinding, retaining it in engagement with the pickup finger as it passes over the wind member. The housing member is provided with angular spaced openings 271 which function as drain openings for water that may be drawn into the housing by retrieving of the line.

We have illustrated and described an embodiment of our invention which we consider highly practical. We have not attempted to illustrate or describe certain embodiments and adaptations which we contemplate, as we believe that this description will enable those skilled in the art to embody or adapt our invention as may be desired.

Having thus described our invention, what is claimed as new and desired to secure by Letters Patent is:

1. In a fishing reel, the combination of a gear box provided with a forwardly projecting tubular bearing member and with an externally threaded flange, an annular drag member adjustably threaded upon said flange, a housing member releasably engaged with said drag member and having a conical front portion provided with a line guide eye at the apex thereof, a driving gear provided with a crank, a driven gear coacting with said driving gear and provided with a bearing sleeve mounted within said bearing member, a spindle drivingly connected to said driven gear and reciprocatingly mounted in said bearing sleeve, a Scotch yoke on said spindle, said driving gear having a crank pin coacting with said yoke, a spool rotatably mounted on said bearing member and comprising front and rear flanges, the rear flange being operatively associated with said drag member, a line wind and guide member disposed within said housing member in spaced relation thereto and having a cylindrical rear portion telescopingly embracing the front spool flange and a conical front portion mounted on said spindle, said cylindrical portion of said line wind member having a longitudinal slot therein, a line pickup finger pivotally mounted within said line wind member to be retracted therein or to be projected to line pickup position, a spring acting to bias said pickup finger to retracted position, a pickup finger actuating member on said spindle, and reverse rotation stop means for said line wind member including said pickup finger when it is in retracted position.

2. In a fishing reel, the combination of a gearbox provided with a forwardly projecting tubular bearing member and with an externally threaded flange, an annular drag member adjustably threaded upon said flange, a driving gear provided with a crank, a driven gear coacting with said driving gear and provided with a bearing sleeve mounted within said bearing member, a spindle drivingly connected to said driven gear and reciprocatingly mounted in said bearing sleeve, a Scotch yoke on said spindle, said driving gear having a crank pin coacting with said yoke, a spool rotatably mounted on said bearing member and comprising front and rear flanges, the rear flange being operatively associated with said drag member, a line wind and guide member mounted on said spindle telescopingly embracing the front spool flange, said line wind member having a longitudinal slot therein, a line pickup finger pivotally mounted within said line wind member to be retracted therein or to be projected to line pickup position, a spring acting to bias said pickup finger to retracted position, a pickup finger actuating member on said spindle, and means for stopping reverse rotation of said line wind member when it is at the forward end of its stroke and the pickup finger is in retracted position.

3. In a fishing reel, the combination of a gearbox provided with a forwardly projecting tubular bearing member and with an externally threaded flange, an annular drag member adjustably threaded upon said flange and provided with an internal annular friction element, a driving gear provided with a crank, a driven gear coacting with said driving gear and provided with a bearing sleeve mounted within said bearing member, a spindle drivingly connected to said driven gear and reciprocatingly mounted in said bearing sleeve, a Scotch yoke on said spindle, said driving gear having a crank pin coacting with said yoke, a spool rotatably mounted on said bearing member and comprising front and rear flanges, the rear flange being operatively associated with said friction element on said drag member, a line wind and guide member mounted on said spindle and telescopingly embracing the front spool flange, said line wind member having a longitudinal slot therein, a line pickup finger pivotally mounted within said line wind member to be retracted therein or to be projected to line pickup position and having a line pickup pin, a spring acting to bias pickup finger to retracted position, a pickup finger actuating member on said spindle, and means for stopping reverse rotation of said line wind member when it is at the forward end of its stroke and the pickup finger is in retracted position.

4. In a fishing reel, the combination of a gearbox provided with a forwardly projecting tubular bearing member and with an externally threaded flange, an annular drag member adjustably threaded upon said flange and provided with an internal annular friction element, a driving gear provided with a crank, a driven gear coacting with said driving gear and provided with a bearing sleeve mounted within said bearing member, a spindle drivingly connected to said driven gear and reciprocatingly mounted in said bearing sleeve, a Scotch yoke on said spindle, said driving gear having a crank pin coacting with said yoke, a spool rotatably mounted on said bearing member and comprising front and rear flanges, the rear flange being operatively associated with said friction element on said drag member, a line wind and guide member mounted on said spindle and telescopingly embracing the front spool flange and having an opening therein, a line pickup finger pivotally mounted within said line wind member to be retracted therein or to be projected to line pickup position through said opening and having a line pickup pin, a spring acting to bias pickup finger to retracted position, a pickup finger actuating member on said spindle, a pickup finger cam plate nonrotatably mounted on said bearing member at the front of the spool and within said line wind member and recessed to permit retraction of said pickup finger with the finger facing downwardly to facilitate disengagement of the line therefrom.

5. In a fishing reel, the combination of a gearbox provided with a forwardly projecting tubular bearing member, an annular drag member adjustably threaded upon said gearbox and provided with an internal annular friction element, a housing member releasably engaged with said drag member and having a conical front portion provided with a line guide eye at the apex thereof, a driving gear provided with a crank and with a crank pin, a driven gear coacting with said driving gear and provided with a bearing sleeve mounted within said bearing member, a spindle drivingly connected to said driven gear and reciprocatingly mounted in said bearing sleeve, a Scotch yoke on said spindle coacting with said crank pin, a spool rotatably mounted on said bearing member and comprising front and rear flanges, the rear flange being operatively associated with said friction element on said drag member, a line wind member disposed within said housing member in spaced relation thereto and having a rear portion telescopingly embracing the front spool flange and a conical front portion mounted on said spindle, said rear portion of said line wind member having an opening therein, a line pickup finger mounted within said line wind member to be retracted therein or to be projected in said opening to line pickup position, a spring acting to bias said pickup finger to retracted position, a pickup finger actuating member on said spindle, a pickup finger cam member acting to permit retraction of said pickup finger with the finger facing downwardly to facilitate disengagement of the line therefrom.

6. In a fishing reel, the combination of a gearbox provided with a forwardly projecting tubular bearing member, an annular drag member adjustably threaded upon said gearbox and provided with an internal annular friction element, a driving gear provided with a crank and with a crank pin, a driven gear coacting with said driving gear and provided with a bearing sleeve mounted within said bearing member, a spindle drivingly connected to said driven gear and reciprocatingly mounted in said bearing sleeve, a Scotch yoke on said spindle coacting with said crank pin, a spool rotatably mounted on said bearing member and comprising front and rear flanges, the rear flange being operatively associated with said friction element on said drag member, a line wind member having a rear portion adapted to telescope over the front spool flange and a conical front portion mounted on said spindle, said rear portion of said line wind member having an opening therein, a line pickup finger mounted within said line wind member to be retracted therein or to be projected in said opening to line pickup position, a spring acting to bias said pickup finger to retracted position, a pickup finger actuating member on said spindle, and a pickup finger control member acting to permit retraction of said pickup finger with the finger facing downwardly to facilitate disengagement of the line therefrom, and automatically stop the reverse rotation of the line wind member at the forward end of its stroke and with the pickup finger in retracted position.

7. In a fishing reel, the combination of a gearbox provided with a forwardly projecting tubular bearing member, a driving gear provided with a crank and with a crank pin, a driven gear coacting with said driving gear and provided with a bearing sleeve mounted within said bearing member, a spindle drivingly connected to said driven gear and reciprocatingly mounted in said bearing sleeve, a Scotch yoke on said spindle having a forwardly curved slot coacting with said crank pin, a spool rotatably mounted on said bearing member, a chambered line wind member carried by said spindle and telescopingly associated with said spool, and having an opening therein, a line pickup finger mounted within said line wind member to be retracted therein or to be projected in said opening to line pickup position, a spring acting to bias said pickup finger to retracted position, and means for permitting the retraction of said pickup finger when in a predetermined position, and stopping the reverse rotation of the line wind member at the forward end of its stroke and with the pickup finger in retracted position.

8. In a fishing reel, the combination of a gearbox provided with a forwardly projecting tubular bearing member, a driving gear provided with a crank and with a crank pin, a driven gear coacting with said driving gear and provided with a bearing sleeve mounted within said bearing member, a spindle drivingly connected to said driven gear and reciprocatingly mounted in said bearing sleeve, a Scotch yoke on said spindle having a forwardly curved slot coacting with said crank pin, a spool rotatably mounted on said bearing member, a chambered line wind member carried by said spindle and telescopingly associated with said spool, and having an opening therein, a line pickup finger mounted within said line wind member to be retracted therein or to be projected in said opening to line pickup position, a spring acting to bias said pickup finger to retracted position, means for permitting the retraction of said pickup finger when in a predetermined position.

9. In a fishing reel, the combination of a gearbox provided with a forwardly projecting tubular bearing member, a driving gear provided with a crank pin, a driven gear coacting with said driving gear and provided with a bearing sleeve mounted within said bearing member, a spindle drivingly connected to said driven gear and reciprocatingly mounted in said bearing sleeve, a Scotch yoke on said spindle having a forwardly curved slot coacting with said crank pin, a spool rotatably mounted on said bearing member, a line wind member carried by said spindle and telescopingly associated with said spool, the rear portion of said line wind member having an opening therein, a line pickup finger mounted within said line wind member to be retracted therein or to be projected in said opening to line pickup position, a cam plate disposed in front of said spool, a spring acting to bias said pickup finger to retracted position, and a pickup finger actuating member on said spindle, said pickup finger coacting with said cam plate to stop the reverse rotation of the line wind member at the forward end of its stroke and with the pickup finger in retracted position.

10. In a fishing reel, the combination of a gearbox provided with a forwardly projecting tubular bearing member, a driving gear provided with a crank and with a crank pin, a driven gear coacting with said driving gear and provided with a bearing sleeve mounted within said bearing member, a spindle drivingly connected to said driven gear and reciprocatingly mounted in said sleeve, driving connections between said pin and spindle for reciprocating the spindle, a spool rotatably mounted on said bearing member, means for frictionally retarding rotation of said spool, a line wind member carried by said spindle and telescopingly associated with the spool, a line pickup finger mounted on said line wind member to be projected to line pickup position or to be retracted, a pickup finger actuating member on said spindle acting to project the finger on line winding rotation of the line winding member, a pickup finger control member nonrotatably mounted on said bearing member at the front of the spool and acting to permit retraction of said pickup finger at a predetermined point in the rotation of the line wind member.

11. In a fishing reel, the combination of a gear box provided with a forwardly projecting tubular bearing support member, a driving gear provided with a crank, a driven gear coacting with said driving gear and provided with a bearing mounted within said bearing support member, a spindle drivingly connected to said driven gear and reciprocatingly mounted in said bearing support member and telescopically arranged with respect to said bearing on said driven gear, driving connections for said spindle to said driving gear for reciprocating the spindle, a spool rotatably mounted on said bearing support member, means for frictionally retarding rotation of said spool, a line wind member carried by said spindle and telescopingly associated with the spool, a line pickup finger mounted on said line wind member to be projected to line pickup position or to be retracted into the line wind member, and a pickup finger actuating member on said spindle acting to project the finger on line winding rotation of the line winding member.

12. In a fishing reel, the combination with a support member, of a driving gear provided with a crank and with a crank pin, a driven gear coacting with said driving gear, a spindle drivingly and reciprocatingly associated with said driven gear, a Scotch yoke on said spindle having a forwardly curved slot coacting with said crank pin, a spool rotatably mounted on said support member and in concentric relation to said spindle, a line wind member carried by said spindle in operative relation to said spool, a line pickup finger mounted on said line wind member to be projected to line pickup position or to be retracted, a pickup finger actuating member on said spindle acting to project the finger on line winding rotation of the spindle, and a relatively fixed pickup finger control member acting to permit retraction of said pickup finger at a predetermined point in the rotation of the line wind member.

13. In a fishing reel, the combination with a support member, of a driving gear provided with a crank and with a crank pin, a driven gear coacting with said driving gear, a spindle drivingly and reciprocatingly associated with said driven gear, a Scotch yoke on said spindle having a forwardly curved slot coacting with said crank pin, a spool rotatably mounted on said support member and in concentric relation to said spindle, a line wind member carried by said spindle in operative relation to said spool, a line pickup finger mounted on said line wind member to be projected to line pickup position or to be retracted, and a pickup finger actuating member on said spindle acting to project the finger on line winding rotation of the spindle and to permit retraction thereof on reverse rotation of the spindle.

14. In a fishing reel, the combination with a support member, of a driving gear provided with a crank and with a crank pin, a driven gear coacting with said driving gear, a spindle drivingly and reciprocatingly associated with said driven gear, a Scotch yoke on said spindle having a forwardly curved slot coacting with said crank pin, a spool rotatably mounted on said support member and in concentric relation to said spindle, adjustable means for frictionally retarding rotation of said spool, a line wind member carried by said spindle in operative relation to said spool, a line pickup finger mounted on said line wind member to be projected to line pickup position or to be retracted, a pickup finger actuating member on said spindle acting to project the finger on line winding rotation of the spindle, and a relatively fixed pickup finger control member permitting retraction of said pickup finger at a predetermined point in the reverse rotation of the line wind member.

15. In a fishing reel, the combination with a support member, of a driving crank mounted thereon, a spindle drivingly and reciprocatingly associated with said crank, a spool rotatably mounted on said support member and in concentric relation to said spindle, a line wind member carried by said spindle in operative relation to said spool, a line pickup finger mounted on said line wind member to be projected to line pickup position or to be retracted into the line wind member, a pickup finger actuating member on said spindle acting to project the finger on line winding rotation of the spindle, and a relatively fixed pickup finger control member acting to permit retraction of said pickup finger at a predetermined point only in the reverse rotation of the line wind member.

16. In a fishing reel, the combination with a support member, of a driving crank mounted thereon, a spindle drivingly and reciprocatingly associated with said crank, a spool rotatably mounted on said support member and in concentric relation to said spindle, a line wind member carried by said spindle in operative relation to said spool, a line pickup finger mounted on said line wind member to be projected to line pickup position or to be retracted into the line wind member, a pickup finger actuating member on said spindle acting to project the finger on line winding rotation of the spindle, and a relatively fixed pickup finger control member acting to permit retraction of said pickup finger at a predetermined point only in the reverse rotation of the line wind member.

17. In a fishing reel, the combination with a support member, of a driving gear mounted thereon provided with a crank and with a crank pin, a driven gear coacting with said driving gear, a spindle drivingly and reciprocatingly associated with said driven gear, a Scotch yoke on said spindle coacting with said crank pin, a rotatably mounted spool having front and rear flanges, an annular drag member adjustably threaded upon said support member to embrace and coact with the rear flange of said spool, a line wind member carried by said spindle and provided with an annular portion axially reciprocable over the front flange of said spool, a line pickup member mounted on said line wind member to be projected to line pickup position to engage a line disposed over the line wind member or to be retracted within the line wind member, and a housing member concentrically embracing said line wind member in annular spaced relation thereto and coacting therewith to provide a line guide space from the spool.

18. In a fishing reel, the combination with a support member, of a driving gear, a driven gear coacting with said driving gear, a spindle drivingly and reciprocatingly associated with said driven gear, means for reciprocating said spindle as it is rotated, a rotatably mounted spool having front and rear flanges, an annular drag member adjustably threaded upon said support member to embrace and coact with the rear flange of said spool, and a line wind member carried by said spindle and operatively associated with said spool.

19. In a fishing reel, the combination with a support member, of a driving gear mounted thereon provided with a crank and with a crank pin, a driven gear coacting with said driving gear, a reciprocatingly mounted spindle drivingly associated with said driven gear and having reciprocating driving connection with said pin, a spool rotatably mounted on said support member in concentric relation to said spindle, a line wind member carried by said spindle, a line pickup member mounted on said line wind member to be projected to line pickup position or to be retracted to inoperative position, a spring acting to retract said line pickup member, a drive element on said spindle having a lost motion connection with said line wind member and adapted when in one position relative to said line wind member to project the pickup member thereof and when in reverse position to permit the retraction of the pickup member by said spring, and a reverse stop means for said line wind member acting only when the line wind member is at the forward end of its stroke.

20. In a fishing reel, the combination with a support member, of a rotatable and reciprocatingly mounted spindle, manually actuated driving means therefor, a spool rotatably mounted on said support member in concentric relation to said spindle, a line wind member carried by said spindle, a line pickup member mounted on said line wind member to be projected to line pickup position or to be retracted to inoperative position, a spring acting to retract said line pickup member, an element on said spindle having a lost motion driving connection with said line pickup member and adapted when in one position relative to said line pickup member to project the pickup member and when in reversed position to permit the retraction of the pickup member by said spring, and a cam plate disposed at the front of the spool and permitting the retraction of the pickup member only when it is downwardly directed to facilitate the disengagement of the line therefrom.

21. In a fishing reel, the combination with a support, of a rotatable and reciprocatingly mounted spindle manually actuated means for rotatably and reciprocatingly driving said spindle, a spool rotatably mounted on said support in concentric relation to said spindle, a line wind member operatively associated with said spool and carried by and having a lost motion driving connection with said spindle, a line pickup member mounted on said line wind member to be projected to line pickup position or to be retracted to inoperative position, a spring acting to retract said line pickup member, said spindle having means acting to project the line pickup member when the spindle is rotated in one direction and to permit it to be retracted by said spring when the spindle is rotated in the reverse direction, a non-rotatable member disposed at the front of the spool and having a downwardly directed recess permitting the retraction of the pickup finger by said spring when the pickup finger is brought into register therewith, the pickup finger being retained in its projected position during the line winding reciprocation of the line wind member.

22. In a fishing reel, the combination with a support member, of a rotatably and reciprocatingly mounted spindle, manually operated driving means for said spindle, a spool rotatably mounted on said support member, adjustable drag means for said spool, a line wind member carried by said spindle for reciprocatory and rotatable movement relative to said spool, a line pickup member mounted on said line wind member to be projected to line pickup position or to be retracted to inoperative position, a spring acting to bias said line pickup member to retracted position, and a pin on said spindle having a lost motion connection to said line pickup member and adapted when in one position relative to the line wind member to project the line pickup member and when in reverse position to permit the retraction thereof by said spring, said pickup member being provided with a lug extending axially of said line wind member engageable with said drive pin to hold said pickup member in projected position as said pickup member and line wind member are slid axially onto said spindle to facilitate the assembly of the line wind member with the spindle.

23. In a fishing reel, the combination with a support member, of a rotatably and reciprocatingly mounted spindle, manually operated driving means for said spindle, a spool rotatably mounted on said support member, adjustable drag means for said spool, a line wind member carried by said spindle for reciprocatory and rotatable movement relative to said spool, a line pickup member mounted on said line wind member to be projected to line pickup position or to be retracted to inoperative position, and a pin on said spindle having a lost motion connection to said line pickup member and adapted when in one position relative to the line wind member to project the line pickup member and when in reverse position to permit the retraction thereof, said pickup member being provided with a lug extending axially of said line wind member and engageable with said pin to hold said pickup member in projected position as said pickup member and line wind member are slid axially onto said spindle to facilitate the assembly of the line wind member on the spindle.

24. In a fishing reel, the combination with a support member, of a rotatably and reciprocatingly mounted spindle including a Scotch yoke on the said spindle and a crank provided with a crank pin coacting with said Scotch yoke, a spool rotatably mounted on said support member, adjustable drag means for said spool, a line wind member carried by said spindle for reciprocatory and rotatable movement relative to said spool, a line pickup member mounted on said line wind member to be projected to line pickup position or to be retracted to inoperative position, and a pin on said spindle having a lost motion connection to said line pickup member and adapted when in one position relative to the line wind member to project the line pickup member and when in reverse position to permit the retraction thereof, said pickup member being provided with a lug extending axially of said line wind member and coacting with said drive pin to hold said pickup member in projected position as said pickup member and line wind member are slid axially onto said spindle to facilitate the assembly of the line wind member on the spindle.

25. In a fishing reel, the combination with a support, of a spool mounted on said support, a spindle mounted for rotative and reciprocatory movement, a line wind member carried by said spindle for rotative and reciprocatory movement relative to said spool, a driving shaft provided with a crank, driving connections for said crank to said spindle for simultaneously rotating and reciprocating the spindle, a bearing for said shaft provided with a peripheral groove and with opposed flattened portions at the outer side of and extending to the groove, an inwardly facing ratchet-jaw clutch member on said shaft, and a coacting spring biased ratchet-jawed clutch member on said shaft bearing having segmental portions slidably coacting with said flattened portions of said bearing when adjusted to one position and rotatably engageable with the wall of the groove for holding the clutch member in its inoperative position, and a stop limiting such rotative movement.

26. In a fishing reel, the combination with a support, of a spool mounted on said support, a spindle mounted for rotative and reciprocatory movement relative to the support, a line wind member carried by said spindle, a driving shaft provided with a crank, driving connections for said crank to said spindle for rotating and reciprocating the spindle, a bearing for said shaft provided with a peripheral groove and with a non-circular portion at the outer side of the groove, an inwardly facing ratchet-jawed clutch member on said shaft, and a coacting manually adjustable spring biased ratchet-jawed clutch member carried by said shaft bearing and having internal noncircular portions which may be registered with the noncircular portions of the bearing member to permit the clutch member to be engaged with the bearing member by the thrust of the spring.

27. In a fishing reel, the combination with a support member, of a driving gear mounted thereon and provided with a crank and with a crank pin, a driven gear coacting with said driving gear, a spindle drivingly and reciprocatingly associated with said driven gear, a Scotch yoke on said spindle having a forwardly curved slot coacting with said crank pin, a rotatably mounted spool, a manually adjustable drag for said spool, and a line wind member carried by said spindle and reciprocable over and rotatably relative to said spool and provided with a line pickup member.

28. In a fishing reel, the combination with a support member, of a driving gear mounted thereon and provided with a crank and with a crank pin, a driven gear coacting with said driving gear, a spindle drivingly and reciprocatingly associated with said driven gear, a Scotch yoke on said spindle having a forwardly curved slot coacting with said crank pin, a spool, and a line wind member carried by said spindle and reciprocable over and rotatable relative to said spool.

29. In a fishing reel, the combination of a support member, a driving gear, a driven gear coacting with said driving gear, a spindle driven and reciprocably associated with said driven gear, a spool rotatably mounted on said support member in concentric relation to said spindle, a line wind member carried by said spindle and comprising a cylindrical rear portion rotatable relative to and axially reciprocable over a portion of said spool, said line wind member having a conical front portion, and a housing member having a cylindrical rear portion and forwardly tapered conical front portion provided with a line guide eye at the apex thereof, the said line wind member and housing member being annularly spaced to permit the line to pass therebetween and coacting to constitute a guide for the line unwound from the spool, said line wind member having a line pickup finger mounted therein to be projected from or retracted within the cylindrical rear portion of said line wind member, said spindle having means acting to project the line wind pickup member when the spindle is rotated in one direction and to permit it to be retracted when the spindle is rotated in the reverse direction and means for stopping reverse rotation of the line wind member with the pickup finger thereof in retracted position.

30. In a fishing reel, the combination with a gear box having a threaded cylindrical surface at its forward end and provided with a forwardly projecting bearing member disposed centrally thereof, a spool rotatably mounted on said bearing member and having a rear flange constituting a friction drag element, an annular drag member threaded to coact with the threads on said cylindrical surface to embrace the rear flange of the spool and having an inwardly projecting annular friction element disposed in opposed relation to said friction element of said spool, a spindle disposed axially of said spool to project at the front thereof, means for rotatably driving and reciprocating said spindle, a level wind member mounted on said spindle in operative relation to said spool, and a housing for said level wind member removably and telescopingly engaged with said drag member.

31. In a fishing reel, the combination with a gear box having a threaded cylindrical surface at its forward end and provided with a forwardly projecting bearing member disposed centrally thereof, a spool rotatably mounted on said bearing member and having a rear flange constituting a friction drag element, an annular drag member threaded to coact with the threads on said cylindrical surface to embrace the rear flange of the spool and having an inwardly projecting annular friction element disposed in opposed relation to said friction element of said spool, a spindle disposed axially of said spool to project at the front thereof, means for rotatably driving and reciprocating said spindle, and a level wind member mounted on said spindle in operative relation to said spool.

References Cited in the file of this patent

UNITED STATES PATENTS

| | | |
|---|---|---|
| 2,521,543 | Shakespeare et al. | Sept. 5, 1950 |
| 2,600,558 | Mauborgne | June 17, 1952 |
| 2,630,979 | Uerling | Mar. 10, 1953 |
| 2,644,647 | Denison et al. | July 7, 1953 |

FOREIGN PATENTS

| | | |
|---|---|---|
| 22,597 | Great Britain | of 1907 |